Feb. 23, 1971 W. N. MATSON 3,564,851
PRESSURE MOTOR
Filed Aug. 27, 1969
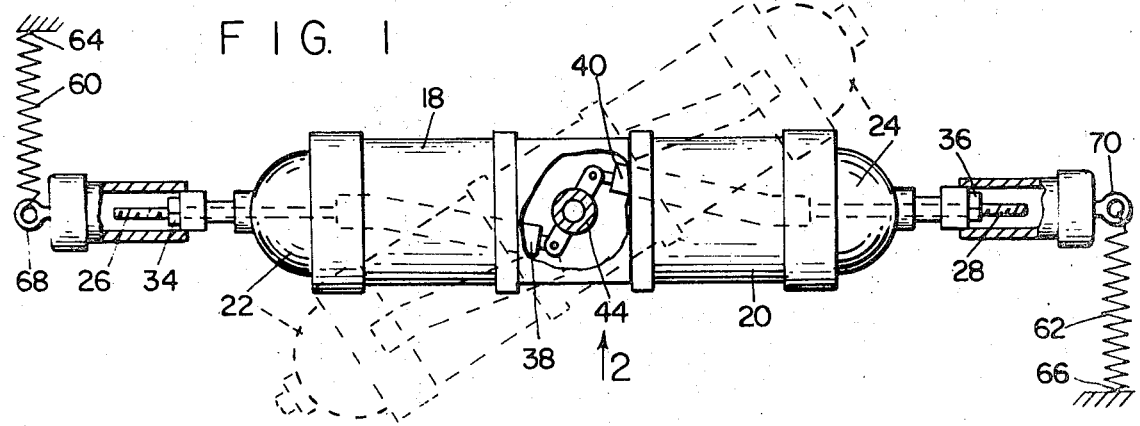
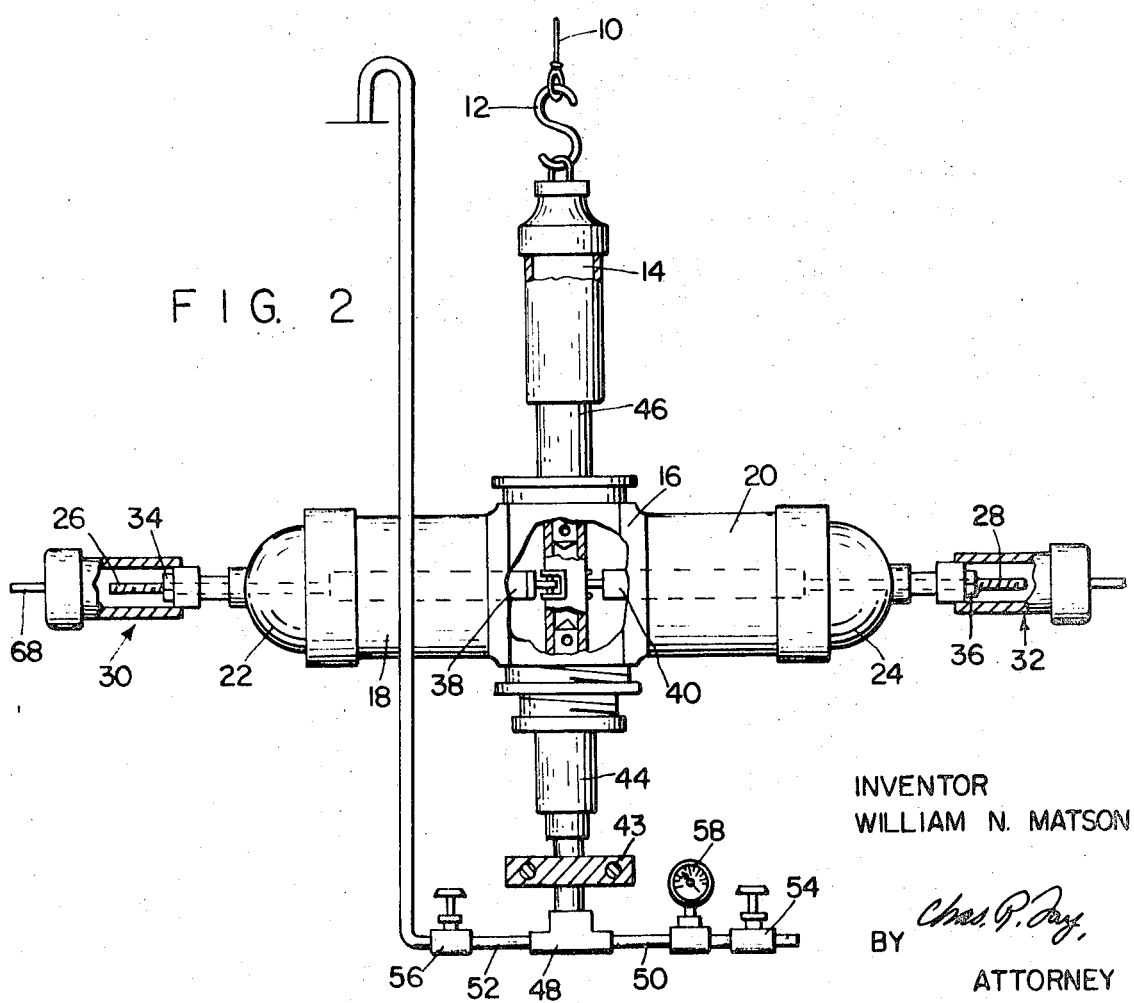
INVENTOR
WILLIAM N. MATSON
BY Chas. P. Fay
ATTORNEY

United States Patent Office 3,564,851
Patented Feb. 23, 1971

3,564,851
PRESSURE MOTOR
William N. Matson, 556 Westminster Hill Road,
Fitchburg, Mass. 01420
Filed Aug. 27, 1969, Ser. No. 853,460
Int. Cl. F01b 29/00
U.S. Cl. 60—1                                        6 Claims

ABSTRACT OF THE DISCLOSURE

An elastomeric member, means placing the same under tension, and means intermittently elongating the member by applying pressure to it in a direction generally normal to the axis of tension, and resilient means attached to the elastomeric member causing an oscillatory motion thereof upon alternate pressure and release of pressure on said member.

BACKGROUND OF THE INVENTION

The present inventor has discovered that if an elastomeric member be placed under tension, e.g. along a certain defined axis and then the member have pressure applied thereto intermediate the ends thereof in a general direction at right angles to the axis of tension of said member, then the elastomeric member relaxes (elongates) to such an extent that another means such as a spring which is attached to it, is enabled to move the elastomeric member in one direction.

SUMMARY OF THE INVENTION

A fixed center element has a cross rod fixed thereto and at the ends of the cross rod there are attached a pair of elastomeric elongated members located in pipes or housings forming a casing or enclosure which is free to rotate within limits, i.e., for oscillatory motion about the fixed center. Tensioning rods are inserted through the ends of the two casings and attached to the elastomeric member which are then placed under tension.

A pipe is led into the casing, this pipe being connected to a source of fluid pressure, together with a pair of valves, one of which may be opened to introduce pressure into the housing, and there being an outlet valve so that pressure may be alternately applied and released with respect to the elongated elastomeric members in the housing. The entire device is conveniently suspended.

At the ends of the tension means there are provided a pair of springs which normally maintain the housing in equilibrium with the elastomeric members under tension but without pressure being applied thereto.

Upon the application of the fluid pressure, a squeezing action is exerted on the elastomeric members and this is generally in a direction at right angles to the axis creating tension thereon. Upon the application of this pressure, the elastomeric members, even though under tension, relax (elongate) and this allows the springs to move the entire housing for a certain distance in a rotative motion. When the pressure is relieved, the elastomeric members once more come under tension or are returned to their tensioned relationship opposing the action of the springs, stretching them, and causing the device to return to its original position, so that an oscillatory motion is seen to be derived by this apparatus.

BRIEF DESCRIPTION OF THE DRAWINGS

FIG. 1 is a plan view illustrating in solid lines the position of the enclosure under influence of the springs and in dotted lines its original position when under influence of the elastomeric members, and FIG. 2 is a view in side elevation with parts in section looking in the direction of arrow 2 in FIG. 1 and showing how the housing is suspended.

PREFERRED EMBODIMENT OF THE INVENTION

Any means such as a cord 10 is used to suspend a hook or S-shaped member 12, in turn suspending any kind of support or chamber 14 to which is secured by any desired means a fitting 16 open at both ends and having secured thereto a pair of pipes or other cylindrical enclosures 18 and 20. These enclosures are closed at the opposite ends by means of reducing members 22 and 24 in which are slidably mounted tension rods 26 and 28. It will be seen that the construction is substantially the same at both ends.

A preloading device generally indicated at 30 and 32 includes nuts 34 and 36 for instance mounted on the threaded ends of the tension rods 26 and 28 and the inner ends of the tension rods are connected to elastomeric members 38 and 40 which are arranged coaxially within the pipes 18 and 20, at the tension rod, but are offset from the center by the cross arms to the amount of turning moment.

These elastomeric members are any kind of rubber or synthetics in elongated form and being generally solid and not spongy. Each one of the elastomeric members is connected at one end to the inner ends of a respective tension rod 26, 28 and the other ends thereof are connected to a clevis generally indicated at 42, this member being mounted in general on a cross rod at the center of oscillation of the entire housing.

There is a center rotatively fixed support 44, as by clamps 43. This may be in the form of an elongated pipe 44 closed at one end at 46 and open at its opposite end to a T fixture at 48, to a source of pressure lead in through a pipe 50 and having an exhaust 52 with an inlet valve 54 and an outlet valve 56. A pressure dial or the like 58 may be used also, and the pipe 52 may rise as shown, avoiding spill. By this means fluid pressure of any description is introduced into the housing 18, 20 with valve 56 closed and valve 54 open, but when valve 54 is closed and valve 56 is open, there is no tendency to flow because of the small compressibility inherent in fluid, the volume being constant otherwise. A minute amount of fluid could exhaust because of the slight give of the housing also. Hence the pressure is relaxed with respect to the elastomeric members 38 and 40 which as seen above are placed under a certain predetermined degree of tension as for instance by the nuts 34 and 36.

Springs 60 and 62 or other similar resilient means are fixed at respective ends 64, 66 and have the other ends thereof as at 68, 70 connected to the ends of the preloading devices. In general the springs 60 and 62 oppose the action of the elastomeric members 38 and 40, the latter being under tension and the springs also being under tension.

Therefore assuming that some means may be provided for alternately opening and closing valve 54 while closing and opening valve 56, it will be seen that an oscillatory motion of the entire housing 18, 20, etc. is produced and obviously this could be associated with some form of continuous motion under influence of for instance a ratchet and pawl, whether of mechanical or of frictional nature. Therefore simply by opening and closing the respective valves as described, a power is derived from the elastomeric members and the springs from which a useful energy may be derived.

This device operates in a reverse manner if placed under negative pressure i.e., vacuum or below atmospheric. The tension in the rubber would increase and the motion would be in the opposite direction, in the event that the negative pressure is used instead of positive pressure.

Where the rubber is put under compression, added pressure tends to increase the compression to cause the motion and the springs would act in the opposite direction.

The block of rubber may be considered fixed rigidly to the tension rod and nut at 36 and the rubber end to the housing end remains a constant, so pressure cannot be recognized at this end. The outer end forces of each rubber piece are equal and opposite in every respect regardless of pressure and of course are 180° apart.

The rubber inner ends also must be considered virtually fixed to the stationary clevis which by its construction cannot move, so that end pressures on the rubber cannot be recognized here. Thus the end forces on the rubber are nullified when under pressure and the side forces are allowed to act permitting the desired movement described above.

All the sources of power utilized throughout the world depend on flow, whether it is gas, water, steam, electricity, etc., but the invention as shown in this case does not depend on flow. It depends on pressure differentials, although a minute amount of flow occurs but this is not the cause of motion but is only waste.

I claim:

1. A pressure motor comprising an enclosure, a fixed member mounting said enclosure for pivotal action thereon, means for alternately introducing pressure into said enclosure and relieving said pressure, an elastomeric member mounted in said enclosure and having one end fixed with relation to said fixed member, a tension device attached to the opposite end of said elastomeric member for placing the same under tension, and resilient means under tension attached to the exterior of said enclosure and having a fixed location whereby said elastomeric member is alternately tensioned and relaxed, and said resilient means is alternately tensioned and shortened causing said enclosure to oscillate upon its axis.

2. The pressure motor of claim 1 wherein the pressure is derived from a pressure source and including a pair of valves, an inlet valve admitting or preventing application of pressure to the enclosure and an outlet valve releasing said pressure when open, with the inlet valve being closed.

3. The pressure motor of claim 1 including a second elastomeric member mounted in opposition with respect to the first elastomeric member, a tension device therefor, and another resilient means connected thereto at the opposite end of said enclosure from the first-named resilient means.

4. The pressure motor of claim 1 including means suspending said enclosure freely.

5. The pressure motor of claim 1 wherein each said tension device comprises a housing external of the enclosure and in extension thereof, a tension rod therein, said tension rod being connected to one end of said elastomeric member, and means for moving said rod in a direction to place tension on the elastomeric member.

6. The pressure motor of claim 1 wherein each said tension device comprises a housing external of the enclosure and in extension thereof, a tension rod therein, said tension rod being connected to one end of said elastomeric member, and means for moving said rod in a direction to place tension on the elastomeric member, said resilient means being attached to the outer end of the tension device in a location removed from the center of oscillation.

References Cited

UNITED STATES PATENTS 3,045,704   7/1962   Williams _____ 137—505.41X

MARTIN P. SCHWADRON, Primary Examiner

A. M. OSTRAGER, Assistant Examiner